US010425630B2

(12) United States Patent
Ukil et al.

(10) Patent No.: US 10,425,630 B2
(45) Date of Patent: Sep. 24, 2019

(54) STEREO IMAGING (71) Applicant: Nokia Technologies Oy, Espoo (FI)

(72) Inventors: Soumik Ukil, Bangalore (IN); Krishna Annasagar Govindarao, Bangalore (IN); Gururaj Gopal Putraya, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 73 days.

(21) Appl. No.: 15/540,200

(22) PCT Filed: Dec. 8, 2015

(86) PCT No.: PCT/FI2015/050860
§ 371 (c)(1),
(2) Date: Jun. 27, 2017

(87) PCT Pub. No.: WO2016/107964
PCT Pub. Date: Jul. 7, 2016

(65) Prior Publication Data
US 2017/0374353 A1    Dec. 28, 2017

(30) Foreign Application Priority Data
Dec. 31, 2014    (IN) .......................... 6836/CHE/2014

(51) Int. Cl.
*G06T 7/593*    (2017.01)
*H04N 13/00*    (2018.01)
(Continued)

(52) U.S. Cl.
CPC ........... *H04N 13/239* (2018.05); *G06T 7/593* (2017.01); *H04N 5/2258* (2013.01);
(Continued)

(58) Field of Classification Search
CPC .. H04N 13/239; H04N 13/296; H04N 5/2258; G06T 7/593
See application file for complete search history.

(56) References Cited

U.S. PATENT DOCUMENTS 8,582,866 B2    11/2013    El Dokor et al.
2005/0123190 A1    6/2005    Zhang et al.
(Continued)

FOREIGN PATENT DOCUMENTS

CN    102404594 A    4/2012
CN    102005039 B    5/2012
(Continued)

OTHER PUBLICATIONS

International Search Report and Written Opinion received for corresponding Patent Cooperation Treaty Application No. PCT/FI2015/050860, dated Dec. 8, 2015, 12 pages.
(Continued)

*Primary Examiner* — Nicholas G Giles
(74) *Attorney, Agent, or Firm* — Alston & Bird LLP (57) ABSTRACT

A technique for digital stereo imaging is provided. According to an example embodiment, the technique comprises facilitating stereo image capturing means for capturing image data, said stereo image capturing means comprising a first imaging subsystem that comprises a first image sensor arranged to receive light via a first lens and a second imaging subsystem that comprises a second image sensor arranged to receive light via a second lens, wherein said first and second imaging subsystems are arranged such that the optical axes of said first and second lenses are in parallel to each other; reading pixel values from respective light-sensitive areas of said first and second image sensors, comprising reading pixel values for a first image from a first readout area on the first image sensor, reading pixel values for a second image from a second readout area on the second image sensor, and
(Continued)

reading pixel values for support data from at least one portion of the light-sensitive area adjacent to the respective readout area on at least one of the first and second image sensors; and deriving disparity information pertaining to said first and second images on basis of said pixel values read for the first image, for the second image and for said support data.

20 Claims, 4 Drawing Sheets

(51) Int. Cl.
   *H04N 5/225* (2006.01)
   *H04N 13/239* (2018.01)
   *H04N 13/296* (2018.01)
(52) U.S. Cl.
   CPC . *H04N 13/296* (2018.05); *G06T 2207/10012* (2013.01); *H04N 2013/0081* (2013.01)

(56) References Cited

U.S. PATENT DOCUMENTS

| | | | |
|---|---|---|---|
| 2009/0041336 A1* | 2/2009 | Ku | G06T 7/593 382/154 |
| 2011/0025827 A1 | 2/2011 | Shpunt et al. | |
| 2012/0038747 A1 | 2/2012 | Sun et al. | |
| 2013/0033572 A1 | 2/2013 | Wernersson | |
| 2013/0033582 A1 | 2/2013 | Sun et al. | |
| 2013/0038600 A1* | 2/2013 | Wang | H04N 19/597 345/419 |
| 2013/0093855 A1 | 4/2013 | Kang et al. | |
| 2013/0329015 A1 | 12/2013 | Pulli et al. | |
| 2014/0198184 A1 | 7/2014 | Stein et al. | |
| 2014/0362179 A1* | 12/2014 | Lee | H04N 13/00 348/43 |
| 2015/0248745 A1* | 9/2015 | Chen | G06T 5/003 382/154 |
| 2015/0261003 A1* | 9/2015 | Morifuji | G09G 3/003 345/8 |
| 2016/0150210 A1* | 5/2016 | Chang | G06T 7/593 382/154 |

FOREIGN PATENT DOCUMENTS

| | | |
|---|---|---|
| CN | 102783161 A | 11/2012 |
| CN | 102939563 A | 2/2013 |
| CN | 103517057 A | 1/2014 |
| EP | 0328527 A1 | 8/1989 |
| EP | 2757789 A1 | 7/2014 |
| JP | H08-205200 A | 8/1996 |
| JP | 2005-099265 A | 4/2005 |
| JP | 2008-503121 A | 1/2008 |
| JP | 2008-040115 A | 2/2008 |
| WO | 88/002518 A2 | 4/1988 |
| WO | 2005/125186 A1 | 12/2005 |
| WO | 2013/169671 A1 | 11/2013 |

OTHER PUBLICATIONS

Zhang et al., "Personal Photograph Enhancement Using Internet Photo Collections", IEEE Transactions on Visualization and Computer Graphics, vol. 20, No. 2, Feb. 2014, pp. 262-275.

Kostavelis et al., "Real-time Algorithm for Obstacle Avoidance Using a Stereoscopic Camera", Proceeding of Third Panhellenic Scientific Student Conference, 2009, 10 pages.

Alhwarin et al., "IR Stereo Kinect: Improving Depth Images by Combining Structured Light with IR Stereo", Pacific Rim International Conference on Artificial Intelligence, 2014, 9 pages.

Extended European Search Report received for corresponding European Patent Application No. 15875300.4, dated Jul. 17, 2018, 8 pages.

Kauff et al., "Depth Map Creation and Image Based Rendering for Advanced 3DTV Services Providing Interoperability and Scalability", Signal Processing: Image Communication, vol. 22, No. 2, Feb. 2007, pp. 217-234.

Office action received for corresponding Chinese Patent Application No. 201580071832.5, dated Aug. 2, 2018, 8 pages of office action and 3 pages of office action translation available.

Office action received for corresponding Japanese Patent Application No. 2017-534812, dated Oct. 2, 2018, 3 pages of office action and 6 pages of translation available.

Office Action for Indian Application No. 6836/CHE/2014 dated Feb. 21, 2019, 8 pages.

Office action received for corresponding Chinese Patent Application No. 2015800718325, dated Apr. 25, 2019, 9 pages.

* cited by examiner

Operate a stereo image capturing means comprising a first image sensor and a second image sensor

310

Read pixel values for a first image from a first readout area on the first image sensor

320

Read pixel values for a second image from a second readout area on the second image sensor

330

Read pixel values for support data from at least one portion of the light-sensitive area adjacent to the respective readout area on at least one of the first and second image sensors

340

Derive disparity information pertaining to said first and second images on basis of said pixel values read for the first image, for the second image and for said support data

STEREO IMAGING

RELATED APPLICATION

This application was originally filed as Patent Cooperation Treaty Application No. PCT/FI2015/050860 filed Dec. 8, 2015 which claims priority benefit to Indian Patent Application No. 6836/CHE/2014, filed Dec. 31, 2014.

TECHNICAL FIELD

The example and non-limiting embodiments of the present invention relate to capturing of digital image data for stereo images.

BACKGROUND

Digital imaging using a stereo camera enables capturing and/or creating three-dimensional (3D) images based partially in depth information that can be derived on basis of two or more images depicting the same scene. In a real-life digital stereo camera two or more image sensors arranged to model human vision are employed to capture respective digital images of a scene. Due to practical constraints, however, the fields of view (FOVs) of captured by two image sensors of the stereo camera are not exactly the same. Consequently, some of the image content of a first image captured using a first image sensor are not included in the image content of a second image captured using a second image sensor. In a typical example in this regard, the first and second image sensors (with respective lens assemblies) are arranged adjacent to each other, separated by a distance that corresponds to a distance between a person's eyes. Due to the different positions of the two image sensors with respect to the scene to be imaged, some of the image content in a leftmost portion of the first image are not included in the second image while, on the other hand, some of the image content in a rightmost portion of the second image is not included in the first image.

The depth information that is typically required to create a digital 3D image representing a scene may be derived on basis of disparity information that can be extracted on basis of two or more images depicting the scene. However, in the example of the first and second image sensors described above, there is no possibility to derive the disparity information for the portions of scene that are depicted only in one of the first and second images and, consequently, the resulting depth information for these image portions is either inaccurate or completely missing, thereby possibly resulting in a 3D image of compromised quality.

SUMMARY

According to an example embodiment, an apparatus is provided, the apparatus comprising stereo image capturing means for capturing image data, said stereo image capturing means comprising a first imaging subsystem that comprises a first image sensor arranged to receive light via a first lens and a second imaging subsystem that comprises a second image sensor arranged to receive light via a second lens, wherein said first and second imaging subsystems are arranged such that the optical axes of said first and second lenses are in parallel to each other; image acquisition means for reading pixel values from respective light-sensitive areas of said first and second image sensors, said image acquisition means configured to read pixel values for a first image from a first readout area on the first image sensor, to read pixel values for a second image from a second readout area on the second image sensor, and to read pixel values for support data from at least one portion of the light-sensitive area adjacent to the respective readout area on at least one of the first and second image sensors; and image processing means for deriving disparity information pertaining to said first and second images on basis of said pixel values read for the first image, for the second image and for said support data.

According to another example embodiment, a method is provided, the method comprising facilitating stereo image capturing means for capturing image data, said stereo image capturing means comprising a first imaging subsystem that comprises a first image sensor arranged to receive light via a first lens and a second imaging subsystem that comprises a second image sensor arranged to receive light via a second lens, wherein said first and second imaging subsystems are arranged such that the optical axes of said first and second lenses are in parallel to each other; reading pixel values from respective light-sensitive areas of said first and second image sensors, comprising reading pixel values for a first image from a first readout area on the first image sensor, reading pixel values for a second image from a second readout area on the second image sensor, and reading pixel values for support data from at least one portion of the light-sensitive area adjacent to the respective readout area on at least one of the first and second image sensors; and deriving disparity information pertaining to said first and second images on basis of said pixel values read for the first image, for the second image and for said support data.

According to another example embodiment, an apparatus is provided, the apparatus comprising a digital imaging system for capturing image data, said digital imaging system comprising a first imaging subsystem that comprises a first image sensor arranged to receive light via a first lens and a second imaging subsystem that comprises a second image sensor arranged to receive light via a second lens, wherein said first and second imaging subsystems are arranged such that the optical axes of said first and second lenses are in parallel to each other; and a controller for controlling operation of said digital imaging system. The controller is configured to read pixel values from respective light-sensitive areas of said first and second image sensors, comprising read pixel values for a first image from a first readout area on the first image sensor, read pixel values for a second image from a second readout area on the second image sensor and read pixel values for support data from at least one portion of the light-sensitive area adjacent to the respective readout area on at least one of the first and second image sensors; and derive disparity information pertaining to said first and second images on basis of said pixel values read for the first image, for the second image and for said support data.

According to another example embodiment, an apparatus is provided, the apparatus comprising at least one processor, a memory storing a program of instructions, wherein the memory storing the program of instructions is configured to, with the at least one processor, configure the apparatus to at least facilitate stereo image capturing means for capturing image data, said stereo image capturing means comprising a first imaging subsystem that comprises a first image sensor arranged to receive light via a first lens and a second imaging subsystem that comprises a second image sensor arranged to receive light via a second lens, wherein said first and second imaging subsystems are arranged such that the optical axes of said first and second lenses are in parallel to each other; read pixel values from respective light-sensitive areas of said first and second image sensors, comprising read pixel values for a first image from a first readout area on the first image sensor, read pixel values for a second image from a second readout area on the second image sensor, and read pixel values for support data from at least one portion of the light-sensitive area adjacent to the respective readout area on at least one of the first and second image sensors; and derive disparity information pertaining to said first and second images on basis of said pixel values read for the first image, for the second image and for said support data.

According to another example embodiment, a computer program is provided, the computer program comprising computer readable program code configured to cause performing the following when said program code is run on a computing apparatus: facilitate stereo image capturing means for capturing image data, said stereo image capturing means comprising a first imaging subsystem that comprises a first image sensor arranged to receive light via a first lens and a second imaging subsystem that comprises a second image sensor arranged to receive light via a second lens, wherein said first and second imaging subsystems are arranged such that the optical axes of said first and second lenses are in parallel to each other; read pixel values from respective light-sensitive areas of said first and second image sensors, comprising read pixel values for a first image from a first readout area on the first image sensor, read pixel values for a second image from a second readout area on the second image sensor, and read pixel values for support data from at least one portion of the light-sensitive area adjacent to the respective readout area on at least one of the first and second image sensors; and derive disparity information pertaining to said first and second images on basis of said pixel values read for the first image, for the second image and for said support data.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Embodiments of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 schematically illustrates some components of an imaging system according to an example embodiment.

DESCRIPTION OF SOME EMBODIMENTS

Figure 1:
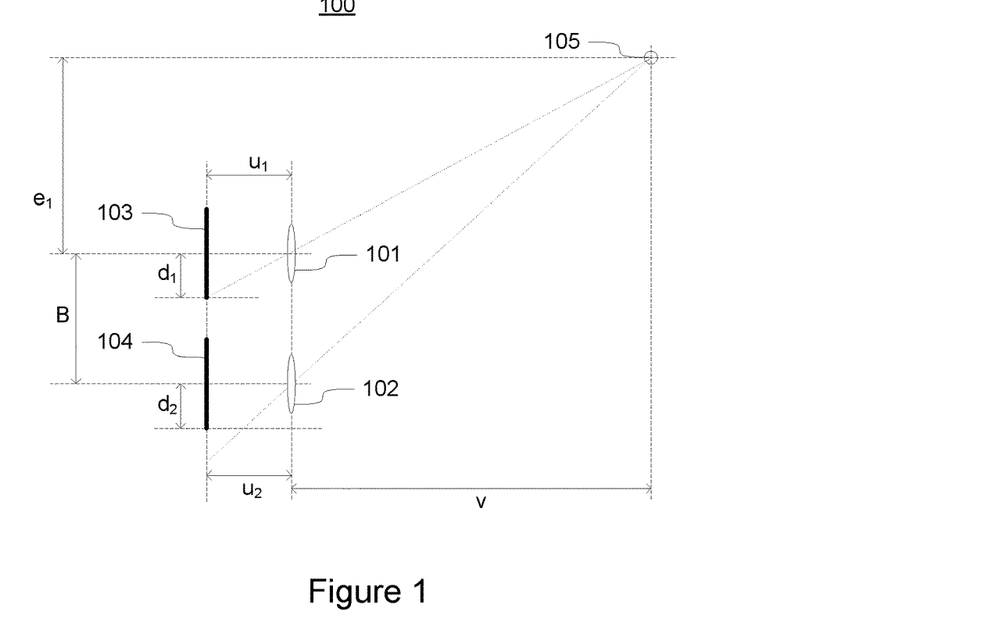

FIG. 1 schematically illustrates some components of an exemplifying digital imaging system 100 for capturing image data for digital stereo imaging. The imaging system 100 may also be referred to as stereo imaging means or as stereo image capturing means. FIG. 1 shows the imaging system 100 with a first lens 101, a second lens 102, a first image sensor 103 and a second image sensor 104. The first lens 101 and the second lens 103 are arranged with respect each other such that their optical axes are parallel, at a distance B from each other. The distance B may be selected such that it approximates a distance between a person's eyes (known as intra-ocular distance) or the distance B may be selected based on the depth resolution requirement of the stereo system. The imaging system 100 may apply a fixed structure with the distance B set to a fixed value (e.g. corresponding to an average intra-ocular distance or a required depth resolution), or the imaging system 100 may employ a structure where the distance B is adjustable to match a desired intra-ocular distance or to provide the required depth resolution.

In some example embodiments, examples of the image capturing means may include device which has two cameras located beside each other for capturing an image/scene as well to get the depth information of the image/scene. For example, a dual camera, an array camera, and the like.

The first image sensor 103 is arranged at a distance $u_1$ from the first lens 101 such that a surface of the first image sensor 103 provided with a light-sensitive area for capturing of image data is perpendicular to the optical axis of the first lens 101 such that light is able to fall on the light-sensitive area when a shutter that is employed to control exposure of the first image sensor 103 is opened. Along similar lines, the second image sensor 104 is arranged at a distance $u_2$ from the second lens 102 such that a surface of the second image sensor 104 provided with a light-sensitive area is perpendicular to the optical axis of the second lens 102 such that light is able to fall on the light-sensitive area when a shutter that is employed to control exposure of the second image sensor 104 is opened. The distance $u_2$ is typically, although not necessarily, the same or substantially the same as the distance $u_1$.

The illustration of FIG. 1 may be considered to represent a plane of the optical axes of the first lens 101 and the second lens 102. While each of the first lens 101 and the second lens 102 are referred to in a singular form (for brevity and for editorial clarity of description), each of the first lens 101 and the second lens 102 may comprise a respective lens assembly comprising one or more lenses arranged such that their optical axes spatially coincide.

The arrangement of the first lens 101 and the first image sensor 103 can be considered to constitute part of a first imaging subsystem, whereas the arrangement of the second lens 102 and the second image sensor 104 may be considered to constitute part of a second imaging subsystem. In other words, the first imaging subsystem comprises the first lens 101 and the first image sensor 103, and the second imaging subsystem comprises the second lens 102 and the second image sensor 104. Each of the first and second imaging subsystems may comprise additional parts of components not depicted in the schematic illustration of FIG. 1.

As an example, each of the first and second imaging subsystems may be provided as a respective dedicated digital imaging module (camera module). As another example, the first and second imaging subsystems may be provided jointly in a single digital stereo imaging module (camera module). Each of the digital imaging modules or the single digital stereo imaging module is operated under control of a controller (e.g. a microprocessor, a microcontroller, etc.).

The first and second imaging subsystems may be provided as identical imaging subsystems, e.g. such that the lenses, the image sensors and other components of the two imaging systems have identical or substantially identical characteristics and they are (spatially) arranged within the respective imaging subsystem in an identical or substantially identical manner. As an example in this regard, the example of FIG. 1 depicts identical first and second imaging subsystems where the first lens 101 is identical or substantially identical to the second lens 102, the first image sensor 103 is identical or substantially identical to the second image sensor 104 and the distance $u_1$ is identical or substantially identical to the distance $u_2$.

Alternatively, non-identical imaging subsystems may be applied with the imaging system 100. In such a scenario the imaging subsystems may exhibit different characteristics e.g. with respect to optical characteristics of the lenses 101, 102, with respect to size of the image sensors 103, 104 and/or with respect to the distances $u_1$ and $u_2$ (and/or with respect to other aspects relative (spatial) arrangement of the lens 101, 102 and the respective image sensor 103, 104). An example embodiment that involves employing non-identical first and second imaging subsystems will be described later in this text.

The light-sensitive area on the lens-facing surface of the image sensor 103, 104 may be provided as an array of light-sensitive elements. The array of light-sensitive elements may be provided using any suitable technology known in the art. As examples in this regard, a charge-coupled device (CCD) or an active-pixel sensor (APS) may be applied. The array of light-sensitive elements is arranged to output a signal indicative of an array of pixels representing an image projected on the light-sensitive area of the image sensor 103, 104 via the respective lens 101, 102. The array of light-sensitive elements is referred to in the following as an exposure area. The center point of the exposure area of an image sensor 103, 104 typically has its center at the point where the optical axis of the lens 101, 102 intersects the respective image sensor 103, 104. The exposure area is typically, but not necessarily, a rectangular area. The exposure area on the first image sensor 103 may be considered to have a width $2*w_1$ and a height $2*h_1$ and the exposure area on the second image sensor 104 to have a width $2*w_2$ and a height $2*h_2$. The array of light-sensitive elements within the exposure area is typically, although not necessarily, arranged in rows and columns of the light-sensitive elements. The image sensors 103, 104 are electrically coupled to a processing element that is able to read the signals representing the images projected on the image sensors 103, 104. The signal read from the image sensor 103, 104 may provide a respective pixel value for each of the light-sensitive elements of the exposure area of the respective image sensor 103, 104, and an array of pixel values obtained (e.g. read) from the exposure area constitute the output image.

Figure 2:
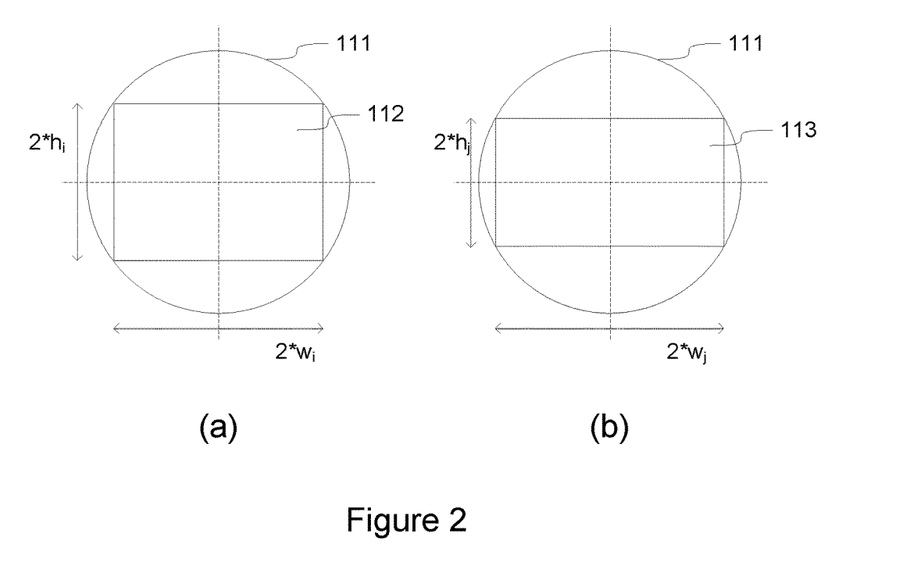
FIG. 2 schematically illustrates use of an exposure area of an image sensor according to an example embodiment.

FIG. 2 schematically illustrates examples of a relationship between an image circle and the exposure area. The image circle represents a cross section of the cone of light transmitted by the lens 101, 102 as projected on the lens-facing surface of the respective image sensor 103, 104. Illustration (a) of FIG. 2 depicts an exposure area 112 that is enclosed by an image circle 111. The exposure area 112, which is co-centered with the image circle 111, has the width $2*w_i$ and the height $2*h_i$ that in this examples represents an aspect ratio of 4:3. Illustration (b) of FIG. 2 depicts an exposure area 113 that is enclosed by and co-centered with the image circle 111. The rectangular exposure area 113 has the width $2*w_j$ and the height $2*h_j$ that represent an aspect ratio of 16:9. The dimensions and/or aspect ratios of exposures area 112 and 113 serve as examples that may be applied for an exposure area of the first and/or second image sensors 103, 104. In the examples of FIG. 2, each of the exposure areas 112, 113 in its entirety may be applied as a respective readout area, i.e. as a portion of the exposure area from which pixel values for the respective output image are read. The readout area may also be referred to as a crop area or an area of crop.

Figure 3:
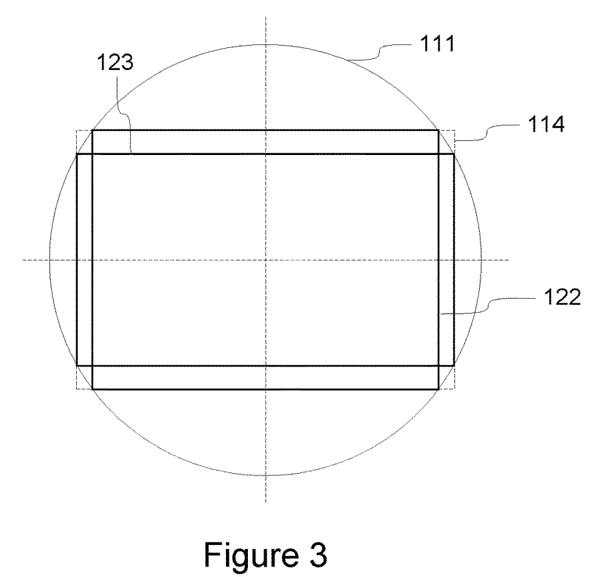
FIG. 3 schematically illustrates use of an exposure area of an image sensor according to an example embodiment.

FIG. 3 schematically illustrates an example of an approach where an exposure area 114 is not completely enclosed by the image circle 111. In this approach, selected one of a multiple predefined readout areas, each of which is fully enclosed by and co-centered with the image circle 111 may be applied for acquisition of pixel values for the output image. In the example of FIG. 3 two examples of a readout area are depicted within the image circle 111: a first readout area 122 that may be employed to read pixel values for an output image having the aspect ratio of 4:3 and a second readout area 123 that may be employed to read pixel values for an output image having the aspect ratio 16:9. Instead of using the readout areas 122 and 123 of the depicted example, additional and/or different readout areas within the imaging circle 111 may be applied.

As can be seen in FIG. 3, each of the depicted choices for a readout area leaves parts of the exposure area 114 unused: if using the readout area 122, respective portions of the exposure area 114 on the left and right sides of the readout area 122 are not used for reading the pixel values for the output image, whereas if using the reading area 123, respective portions of the exposure area 114 above and below the readout area 123 are not used for reading the pixel values for the output image. Nevertheless, these unused parts of the exposure area are within the image circle 111 and hence receive light via the respective lens 101, 102 when the respective shutter is open. In some example embodiments, pixel values in one or more unused portions of the exposure area may be applied as support data for subsequent processing of output image(s), as will be described in more detail later in this text.

The first lens 101 and the second lens 102 preferably comprises a respective rectilinear lens that enables spatially non-distorted images to be projected on the exposure area of the respective one of the first image sensor 103 and the second image sensor 104. The AOV, also referred to as a field of view (FOV), of an imaging subsystem across a dimension of interest can be calculated using the following equations.

$$\alpha_1 = 2*\tan^{-1}\left(\frac{d_1}{u_1}\right) \text{ and} \qquad (1a)$$

$$\alpha_2 = 2*\tan^{-1}\left(\frac{d_2}{u_2}\right), \qquad (1b)$$

where in the equation (1a) $\alpha_1$ denotes the AOV for the first imaging subsystem, and, $d_1$ denotes the distance between a centerline of the first lens 101 and an outer edge of the exposure area of the first image sensor 103 in a direction of interest (e.g. one of a half-width $w_1$ or a half-height $h_1$ of the exposure area), whereas in the equation (1b) $\alpha_2$ denotes the AOV for the second imaging subsystem and $d_2$ denotes the distance between a centerline of the second lens 102 and an outer edge of the exposure area of the second image sensor 104 in a direction of interest (e.g. one of the half-width $w_2$ or the half-height $h_2$ of the exposure area). Consequently, the overall dimension of the exposure area of the first image sensor is $2*d_1$ (e.g. the width $2*w_1$ or the height $2*h_1$) whereas the overall dimension of the exposure area of the second image sensor 104 is $2*d_2$ (e.g. the width $2*w_2$ or the height $2*h_2$).

We may further denote a focal length of the first lens 101 by $f_1$ and a focal length of the second lens 102 by $f_2$. In order to ensure acquiring sharp images of distant objects using the first imaging arrangement, the distance $u_1$ between the first lens 101 and the surface of the first image sensor 103 needs to be equal to the focal length $f_1$ of the first lens 101 for an object at infinity otherwise governed by the lens equation $1/f_1=1/u_1+1/v_1$, where $v_1$ is the distance between the lens and the object. Similarly, for acquiring sharp images of distant objects using the second imaging arrangement, the distance $u_2$ between the second lens 102 and the surface of the second image sensor 104 needs to be equal to the focal length $f_2$ of the second lens 102 for an object at infinity otherwise governed by the lens equation. In order to enable acquisition of sharp images of objects that may lie in a wide range of distances from the lenses 101, 102, the distances $u_1$ and $u_2$ may be adjustable e.g. to enable fine tuning of image sharpness. Typically, in such an arrangement the distances $u_1$ and $u_2$ are jointly adjustable such that an adjustment operation causes both the distance $u_1$ and the distance $u_2$ to be adjusted by an equal or by a substantially equal amount in direction of the optical axis of the respective lens 101, 102.

Referring back to the example illustrated in FIG. 1, symbol $e_1$ denotes a distance from the optical axis of the first lens 101 along the plane depicted in FIG. 1 to a point 105. This distance defines an outer limit of the AOV of the first imaging subsystem for objects that are at distance v from the first lens 101 in a direction of the optical axis of the first lens 101. In other words, at the distance v from the lens 101 in the direction of the optical axis of the first lens 101, an object is within the AOV and hence projected within the exposure area of the first image sensor 103 if it is not further than $e_1$ from the optical axis of the first lens 101 along the plane depicted in FIG. 1. However, an object at the point 105 is not projected within the exposure area of the second image sensor 104 and it is hence outside the AOV of the second imaging subsystem.

Without losing generality, if assuming a horizontal baseline for the imaging system 100 (i.e. for an arrangement where in the default usage orientation of the imaging system 100 the first and second imaging subsystems are arranged side by side), we may consider $e_1$ to correspond to the half-width of the AOV (e.g. half of a horizontal AOV) at the distance v from the first lens 101, and the horizontal AOV may be computed as $$\alpha_1 = 2*\tan^{-1}\left(\frac{e_1}{v}\right). \qquad (2)$$

Along similar lines, for a vertical baseline (i.e. for arrangement where in the default usage orientation of the imaging system 100 the first and second imaging subsystems are arranged on top of each other), we may assume $e_1$ to correspond to the half-height of the AOV (e.g. half of a vertical AOV) at the distance v from the first lens 101, and the vertical AOV may be computed using the equation (2).

Figure 4:
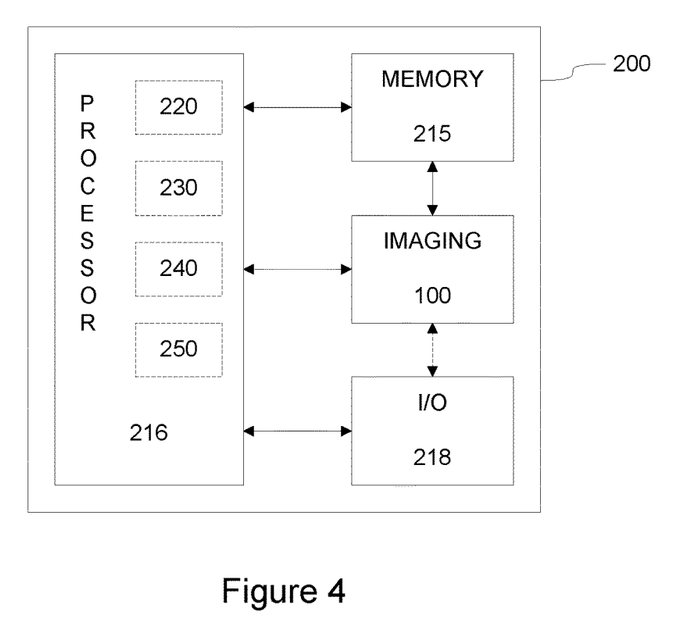
FIG. 4 schematically illustrates an electronic device according to an example embodiment.

The imaging system 100 may be employed as part of an electronic device, such as a digital camera, a camcorder, a mobile phone, a media player device, a tablet computer, a laptop computer, a personal digital assistant (PDA), a portable navigation device, a gaming device, etc. FIG. 4 schematically illustrates some components of an exemplifying electronic device 200 that may be employed to host the imaging system 100. In addition to the imaging system 100, the device 200 further comprises a processor 216 and a memory 215 for storing data and computer program code. The device 200 further comprise user I/O (input/output) components 218 that may be arranged, possibly together with the processor 216 and a portion of the computer program code, to provide a user interface of the device 200 for receiving input from a user and/or providing output to the user. The processor 216 may be arranged to control operation of the device 200 e.g. in accordance with the computer program code stored in the memory 215 and possibly further in accordance with the user input received via the user I/O components 218. Although depicted in FIG. 4 as components separate from the imaging system 100, at least some of the memory 215, the processor 216 and the I/O components 218 may be provided, partially or in their entirety, as part of the imaging system 100.

The memory 215 and a portion of the computer program code stored therein may be further arranged to, with the processor 216, to provide one or more aspects of a control function for controlling at least some aspects of operation of the imaging system 100. As a few examples in this regard, the control function may provide shutter control means 220, image parameter control means 230, and image processing means 250, depicted in FIG. 4 as logical entities in the processor 216.

In some embodiments, the shutter control means 220 can be device and/or software to control the exposure of the image sensor. For example a mechanical shutter in front of the lens, or the software code to control the duration of the exposure to the sensor pixel. The image parameter means 230 can be parameters of the whole imaging system like the exposed sensor area, read out sensor area, focal-length, aperture size, and the like. In some embodiments, examples of the image acquisition means 240 include additional circuitry and/or the software needed for assisting capturing a scene/image intensity in a sensor as image pixels, transferring and storing the pixel values for the image processing unit. An example of image processing means 250 include, but is not limited to, a processor.

In some embodiments, example of the image acquisition means 240 may include, a complementary metal-oxide semiconductor (CMOS) sensor, a charge coupled devices (CCD) sensor, a quantum film sensor, or an organic sensor.

The shutter control means 220 may comprise shutter speed control means. Some examples of the shutter control means 220 include a software module used to set the exposure duration in a software or a mechanical shutter device. for selecting the exposure time (also referred to as shutter speed) for the first and second imaging subsystems of the imaging arrangement 100. The selection of exposure time may be automatic (based on e.g. measurements of current level of ambient light) or the selection may be made in accordance with a user selection received via the user interface of the device 200. As a further alternative, a fixed predetermined exposure time may be applied.

The shutter speed control means may be arranged to jointly select the exposure times for the first and second imaging subsystems such that the same exposure value (EV) is selected for the both imaging subsystems to ensure identical or substantially identical light transmission to both image sensors 103, 104 upon capturing the respective output images. In case the lenses 101 and 102 have the same f-number, joint selection of the exposure time may comprise selecting the same exposure time for both the first and the second imaging subsystems, whereas in case of lenses 101, 102 with different f-numbers the joint selection may comprise selecting different exposure times for the first and second imaging subsystems such that the EV for the both imaging subsystems is the same or substantially the same in consideration of the respective f-numbers.

As another example, the shutter speed control means may be arranged to separately and independently select the exposure times for the first and second imaging subsystems. The selection may be automatic or it may be made in accordance with user selections received via the user interface of the device 200. While the separate and independent selection of exposure times enables the flexibility of individually tuning the EVs for the first and second imaging subsystems, this approach also requires greater care to ensure selecting the exposure times such that a suitable balance between the light transmission to the first image sensor 103 and the light transmission to the second image sensor 104 upon capturing the respective output images.

The shutter control means 220 may comprise shutter actuation means for opening the shutters of the first and second imaging subsystems. The shutter actuation means may be arranged to jointly cause opening the shutters of the first and second imaging subsystems for a period defined by the exposure time currently selected for the respective imaging subsystem. An example of the shutter actuation means include a hardware used to initiate the process of start and end of shutter. The opening of the shutters may be triggered e.g. by a user command received via the user interface of the device 200. The actuation control means is arranged to cause exposure of the first and second image sensors 103, 104 such that they both capture a respective output image of the same scene using their respective AOVs. In this regard, in case the same or substantially the same exposure time is applied for the first and second imaging subsystems, the shutter actuation means may be arranged to both open and close the shutters of the two imaging subsystems at the same or substantially the same time. In case different exposure times are applied for the first and second imaging subsystems, the shutter actuation means may be arranged to control opening and closing of the shutters such that the open state of the shutter for the imaging subsystem with a shorter exposure time fully (temporally) overlaps with that of the shutter for the other imaging subsystem. As examples in this regard, the shutter actuation means may be arranged to cause opening of the shutters of the first and second imaging subsystems at the same or substantially the same time or to cause closing of the shutters of the first and second imaging subsystems at the same or substantially the same time.

According to an example embodiment described in the following, the imaging subsystems of the imaging system 100 are identical or substantially identical. In such an arrangement, the image parameter control means 230 may be arranged to select a first readout area for the first image sensor 103 and a second readout area for the second image sensor 104 among at least two predefined available readout areas. The selection(s) may be made e.g. in accordance with a user selection received via the user interface of the device 200 or a predetermined (e.g. preselected) one of the available readout areas may be employed. The predefined readout areas that are available for selection typically, although not necessarily, include rectangular readout areas of different aspect ratios. As an example, the readout areas 122 and 123 described in context of FIG. 3, possibly together with one or more further readout areas, may be available for selection. The image acquisition means 230 preferably selects an identical readout area for both the first and second image sensors 103, 104.

Consequently, the first and second readout areas do not cover the exposure area of the respective image sensor 103, 104 in full but on each of the image sensors 103, 104 there are one or more portions of unused exposure area adjacent to the readout area, i.e. between the outline of the respective readout area and the outline of the exposure area. This is schematically depicted in FIG. 5 by using the exposure area 114 and the readout areas 122 and 123 described in context of FIG. 3 as example.

Figure 5:
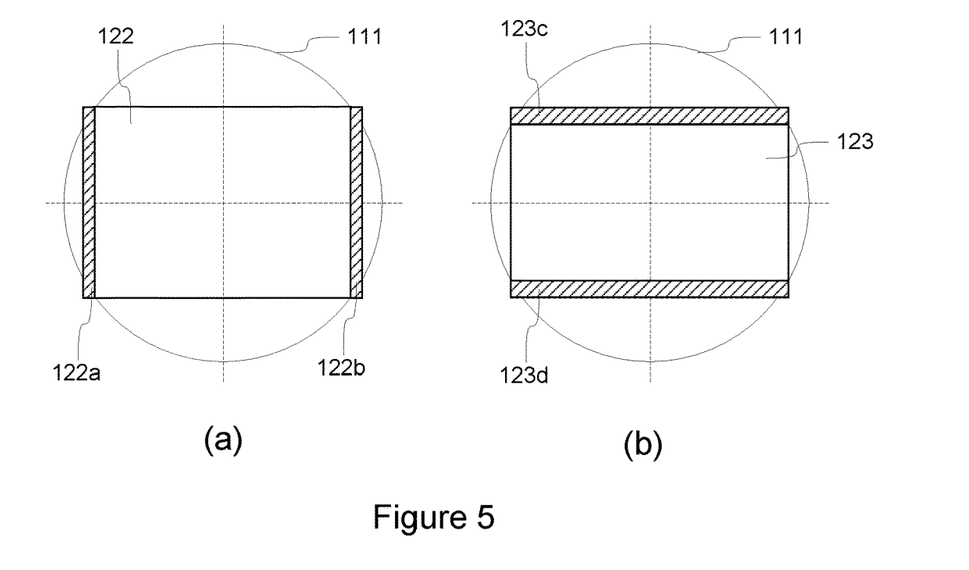
FIG. 5 schematically illustrates use of an exposure area of an image sensor according to an example embodiment.

In FIG. 5, illustration (a) indicates the unused areas of the exposure area 114 when employing the readout area 122: there is a unused area 122*a* between the left border of the readout area 122 and the left border of the exposure area 114 and another unused area 122*b* between the right border of the readout area 122 and the right border of the exposure area 114 (in other words, for the readout area 122 there are unused areas on the sides of the readout area 122). Illustration (b) indicates unused areas of the exposure area 114 when employing the readout area 123: there is a unused area 123*c* between the top border of the readout area 123 and the top border of the exposure area 114 and another unused area 123*d* between the bottom border of the readout area 123 and the bottom border of the exposure area 114 (in other words, for the readout area 123 there are unused areas above and below the readout area 123).

The image acquisition means 240 is arranged to read first image data from the first image sensor 103 and second image data from the second image sensor 104 immediately or substantially immediately after completion of the exposure time of the respective imaging subsystem. In this regard, the image acquisition means 240 may be arranged to read pixel values for a first image from the first readout area selected for the first image sensor 103 and to read pixel values for a second image from a second readout area selected for the second image sensor 104. The read pixel values for the first and second images may be stored in the memory 215 for derivation and provision of one or more output images and/or for further processing of the obtained image data, e.g. for derivation of disparity information pertaining to the first and second images.

The image acquisition means 240 is further arranged to read support data from at least one unused area of an exposure area, which at least one unused area is adjacent to the first readout area (on the exposure area of the first image sensor 103) and/or adjacent to the second readout area (on the exposure area of the second image sensor 104). In this regard, the image acquisition means 250 may be arranged to read pixel values for the support data from at least one such unused area of the exposure area of the first image sensor 103 and/or the second image sensor 104. The read pixel values for the support data may be stored in the memory 215 for further use by the image processing means 250.

As an example, the image acquisition means 240 may be arranged to read a first set of pixel values for support data from an unused area that is between the first readout area and the border of the exposure area of first image sensor 103 on the side of the first image sensor 103 that is furthest from the optical axis of second lens 102 (e.g. on the side of the second image sensor 104 that is furthest from the second image sensor 104). The first set of pixel values for the support data may be employed to augment the pixel values of the first image in order to facilitate derivation of the disparity information in the image processing means 250 in an improved manner.

Additionally or alternatively, the image acquisition means 240 may be arranged to read a second set of pixel values for support data from an unused area that is between the second readout area and the border of the exposure area of second image sensor 104 on the side of the second image sensor 104 that is furthest from the optical axis of first lens 101 (e.g. on the side of the second image sensor 104 that is furthest from the first image sensor 103). The second set of pixel values for the support data may be employed to augment the pixel values of the second image in order to facilitate derivation of the disparity information in the image processing means 250 in a further improved manner.

Referring to back to FIG. 5(a), if using the readout area 122 for the first and second image sensors 103, 104, the first set of pixel values may comprise pixel values from the unused area 122a and the second set of pixel values may comprise pixel values from the unused area 122b (or vice versa). The set of pixels read from an unused area may comprise e.g. all pixels included in the respective unused area 122a, 122b or a predefined number of columns of pixels in the respective unused area 122a, 122b that are closest to the respective readout area. Such an approach may be especially advantageous if using the imaging system 100 arranged to employ a horizontal baseline.

As another example, referring to FIG. 5(b), if using the readout area 123 for the first and second image sensors 103, 104, the first set of pixel values may comprise pixel values from the unused area 123c and the second set of pixel values may comprise pixel values from the unused area 123d (or vice versa). The set of pixels read from an unused area may comprise e.g. all pixels included in the respective unused area 123c, 123d or a predefined number of rows of pixels in the respective unused area 123c, 123d that are closest to the respective readout area. Such an approach may be especially useful if using the imaging system 100 arranged to employ a vertical baseline.

Since portions of the unused areas 122a, 122b, 123c, 123d extend outside the image circle 111, they are typically not guaranteed to receive sufficient amount of light and hence pixel values read from these portions may be invalid and may be ignored in subsequent processing (e.g. by the signal processing means 250).

The image processing means 250 may be configured to derive disparity information between the first image and the second image. In this regard, the image processing means 250 may be arranged to derive the disparity information pertaining to the first and second images on basis of the pixel values read for the first image, the pixel values read for the second image and the pixel values read for the support data.

Due to different positions of the first imaging subsystem and the second imaging subsystem in relation to the environment of the device 200, the first and second output images represent slightly different views of the photographed scene depicted in the first and second images. In particular, the view to the photographed scene depicted in first output image is a spatially shifted version of that depicted in the second output image (and vice versa), where the extent of the spatial shift in the image plane depends on the characteristics of the first and second imaging subsystems, the distance B between the optical axes of the first and second lenses 101, 102 and the distance v between a depicted object and the plane of lenses 101, 102. In particular, objects at different distances from the plane of lenses 101, 102 experience different spatial shift in the image plane, which enables the computation of disparity (and hence depth) for the captured scene. Given an image and a corresponding depth map, there are a number of post processing effects that can be applied, examples include bokeh (artificial shallow depth of field by blurring depending on depth), foreground segmentation/matting, etc.

Hence, due to the spatial shift, the image features appear in the first image in a different position (e.g. relative to the center of the image) than in the second image. To describe the extent of spatial shift in the image plane, derivation of the disparity information may involve deriving a disparity map for pixels of the first and second images. As an example, the derivation of the disparity map may involve finding for each pixel of the first image a corresponding pixel of the second image, i.e. the pixel of the second image that depicts the same real-world feature as the pixel of the first image under consideration, and using the difference in these pixels positions as the disparity indication for the pixel of the first image under consideration. Various techniques for deriving the disparity information are known in the art. As an example, finding disparity indication for pixels in a sub-area of the first image may involve e.g. finding a shift (as the number of pixels) that maximizes a (normalized) correlation or that minimizes a sum of (squared or absolute) differences between the pixel values within the sub-area in the first image and the pixel values in a similar sub-area in the second image.

However, due to the spatial shift, in case of readout areas of identical shape and size, there is a region on a first side of the first image (i.e. on the side corresponding to the side of the first image sensor 103 that is closest to the second image sensor 104) and another region in the opposite side of the second image (i.e. on the side corresponding to the side of the second image sensor 104 that is closest to the first image sensor 103) that is not depicted at all in the other one of the first and second images. Consequently, a conventional disparity map derived on basis of the pixel values of the first image and pixel values of the second image does not enable computing the disparity indications for these regions of the first and second images.

To account for this shortcoming, the image processing means 250 is arranged to augment the pixel values of the first image with the first set of pixel values for the support data to create an augmented first image and/or to augment the pixel values of the second image with the second set of pixel values for the support to create an augmented second image. If the augmented first image is available, the image processing means 250 is configured employ the augmented first image instead of the first image in derivation of the disparity information. Along similar lines, if the augmented second image is available, the image processing means 250 is configured to employ the augmented second image instead of the second image in derivation of the disparity information. In other words, the image processing means 250 is configured to carry out the derivation of the disparity information, e.g. the disparity map, on basis of the augmented first image and/or augmented second image, thereby enabling computation of the disparity indications for at least part of the regions of the first and/or second images depicting image content that is not included in the other one of the first and second images.

The augmentation of the first image enlarges the AOV from that of the first image to enclose at least part of the image content that is depicted in the second image but that is not depicted in the first image. Similarly, the augmentation of the second image enlarges the AOV from that of the second image to enclose at least part of the image content that is depicted in the first image but that is not depicted in the second image. Making use of the augmented first image and/or the augmented second image in derivation of the disparity information enables deriving accurate disparity information for enlarged area of the first and second images, thereby enabling a depth map that has the improved FOV with respect to the output image (so that, any editing of the image using the depth map can apply to the improved FOV).

Consequently, the image processing means 250 may be arranged to create a 3D image (a stereo image) on basis of the first image, the second image and the disparity map derived on basis of the augmented first image and/or the augmented second image. Making use of the disparity map derived on basis of the augmented first image and/or the augmented second image enables creation of a depth map that has the improved FOV with respect to the output image, unlike the case where the depth map would be available only for a part of the output image FOV.

In the foregoing, various aspects and variations of an example embodiment that makes use of identical imaging subsystems was described. However, the description generalizes into scenarios where imaging subsystems are not strictly identical but where the exposure areas on the first and second image sensors 103, 104 extend beyond the respective readout areas but that may not be identical or substantially identical in shape and size.

In another example embodiment described in the following, the first and second imaging subsystems may be non-identical such that the AOV of the second imaging subsystem is larger than that of the first imaging subsystem at least in one dimension to extent that the second imaging subsystem is able to completely enclose the image content enabled by the AOV of the first imaging subsystem in said at least one dimension. For a horizontal baseline, this at least one dimension comprises at least the horizontal dimension, whereas for a vertical baseline the at least one dimension comprises at least the vertical dimension.

Figure 6:
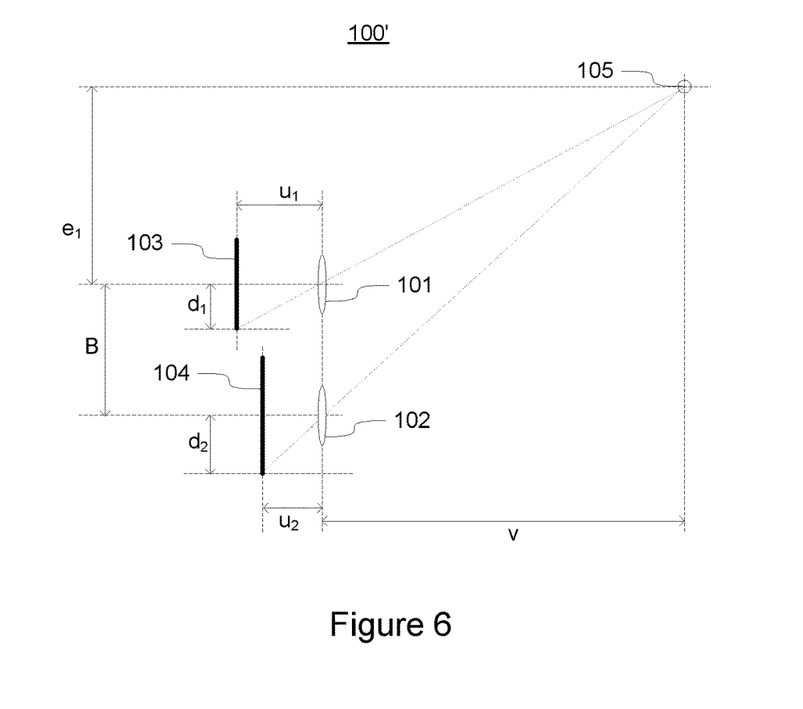
FIG. 6 schematically illustrates some components of an imaging system according to an example embodiment.

As an example in this regard, FIG. 6 schematically illustrates an exemplifying imaging system 100', which is a variation of the imaging system 100 of FIG. 1. The imaging system 100' differs from the imaging system 100 in that the first and second imaging subsystems are non-identical: the second image sensor 104 is larger than the first image sensor 103 ($d_2 > d_1$) and the distance $u_2$ is smaller than the distance $u_1$. With suitable selection of $d_1$, $d_2$, $u_1$, and $u_2$ such an approach enables an angle of view (AOV) of the second imaging subsystem to completely cover that of the first imaging subsystem. As illustrated in FIG. 6, in the imaging system 100' an object at the point 105 (at an outer limit of the AOV of the first imaging subsystem) is also projected on the exposure area of the second image sensor 104 and the point 105 is hence within the AOV of the second imaging subsystem. The same goal is reachable also e.g. by making the second image sensor 104 larger than the first image sensor (such that $d_2 > d_1$) while keeping the distances $u_1$ and $u_2$ identical or substantially identical, or by making the distance $u_2$ smaller than the distance $u_2$ while keeping the (sizes of) the image sensors 103, 104 identical or substantially identical (e.g. such that $d_2 = d_1$).

For such an imaging system 100', the image acquisition means 240 may be arranged to employ a fixed predetermined first readout area for the first imaging subsystem, which first readout area that covers the exposure area of the first image sensor 103 in full, e.g. according to examples described in context of FIG. 2. On the other hand, for the second imaging subsystem the image acquisition means 240 may be arranged to employ a (predetermined) second readout area that is identical in shape and size with the first readout area.

Moreover, the image acquisition means 240 may be further arranged to read support data from at least one unused area of the exposure area that is adjacent to the second readout area (on the exposure area of the second image sensor 104). In this regard, the image acquisition means 250 may be arranged to read pixel values for the support data from at least one such unused area of the exposure area of the second image sensor 104. The read pixel values for the support data may be stored in the memory 215 for further use by the image processing means 250. As a particular example in this regard, the image acquisition means 240 may be arranged to read a set of pixel values for support data from an unused area that is between the second readout area and the border of the exposure area of second image sensor 104 on the side of the second image sensor 104 that is furthest from the optical axis of first lens 101 (e.g. on the side of the second image sensor 104 that is furthest from the first image sensor 103).

This set of pixel values for the support data may be employed to augment the pixel values of the second image in order to facilitate derivation of the disparity information in the image processing means 250 in a further improved manner. In this scenario the image processing means 250 may be arranged to augment the pixel values of the second image with the set of pixel values for the support to create an augmented second image and to derive the disparity information, e.g. the disparity map, on basis of the first image and the augmented second image along the lines described in the foregoing.

In order to make the exposure area of the second image sensor 104 large enough (in comparison to that of the first image sensor 103) in a desired dimension, the following observations can be made.

Based on FIGS. 1 and 6 we may write $$\frac{e_1}{d_1} = \frac{v}{u_1} \Rightarrow \frac{e_1}{v} = \frac{d_1}{u_1} \quad (3)$$

and $$\frac{e_1 + B}{v} = \frac{d_2}{u_2} \Rightarrow \frac{e_1}{v} + \frac{B}{v} = \frac{d_2}{u_2}. \quad (4)$$

By substituting the equation (3) to the equation (4) we may write $$\frac{d_1}{u_1} + \frac{B}{v} = \frac{d_2}{u_2}. \quad (5)$$

By using the following relationships $$\frac{1}{u_1} + \frac{1}{v} = \frac{1}{f_1}$$

$$\frac{1}{u_2} + \frac{1}{v} = \frac{1}{f_2}$$

we may write the equation (5) into $$d_1\left[\frac{f_2(v-f_1)}{f_1(v-f_2)}\right] + \frac{Bf_2}{v-f_2} = d_2. \quad (6)$$

If further assuming identical focal lengths $f_1$ and $f_2$, the equation (6) becomes $$d_1 + \frac{Bf_1}{v-f_1} = d_2. \quad (7)$$

Hence, the equation (7) may be employed to derive the minimum size of the exposure area on the second image sensor 104 in relation to the size of the exposure area of the first image sensor 103 at least in one dimension (e.g. its width and/or it height) to ensure that second imaging subsystem is able to completely enclose image content captured by the first imaging subsystem.

Figure 7:
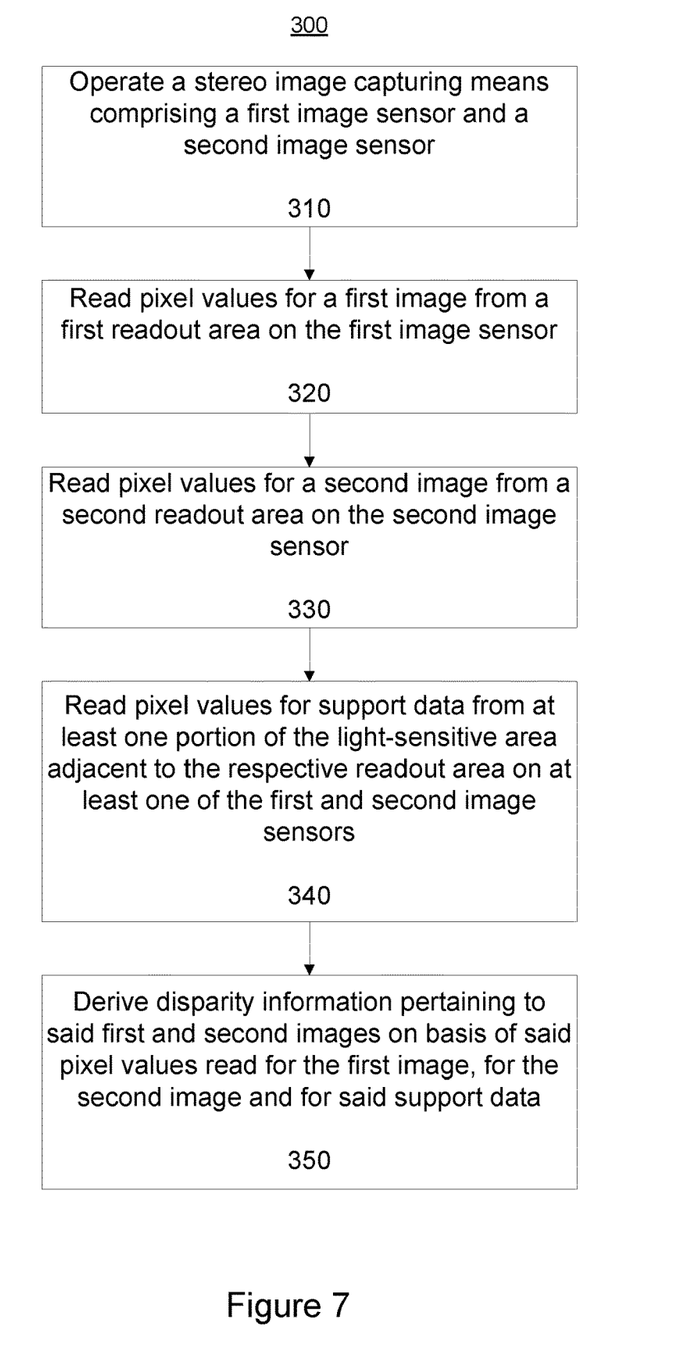
FIG. 7 illustrates a method according to an example embodiment.

FIG. 6 illustrates a method 300 according to an example embodiment. The method 300 comprises operating the stereo image capturing means 100, 100', as indicated in block 310. The method 300 further comprises reading pixel values from respective light-sensitive areas of the first and second image sensors 103, 104. This reading comprises reading pixel values for a first image from the first readout area on the first image sensor 103, as indicated in block 320, reading pixel values for a second image from the second readout area on the second image sensor 104, as indicated in block 320, and reading pixel values for support data from at least one portion of the light-sensitive area adjacent to the respective readout area on at least one of the first and second image sensors 103, 104, as indicated in block 340. The method 300 further comprises deriving disparity information pertaining to said first and second images on basis of said pixel values read for the first image, for the second image and for said support data, as indicated in block 350. The method 300 may further comprise creating a 3D image (a stereo image) on basis of the disparity information together with the pixels read for the first and/or second image and outputting the created 3D image.

The method steps described in context of the blocks 310 to 350 (and any possible additional steps) may be embodied and/or varied in a number of ways, e.g. as described in the foregoing in more detailed description of the operation of the imaging system 100, 100'.

Referring back to FIG. 4, the processor 216 is configured to read from and write to the memory 215 and the processor 236 is configured to read from and write to the memory 235. Although the processor 216 is depicted as a single component, the processor 216 may be implemented as one or more separate components. Similarly, although the memory 215 is illustrated as a single component, the memory 215 may be implemented as one or more separate components, some or all of which may be integrated/removable and/or may provide permanent/semi-permanent/dynamic/cached storage.

The memory 215 may store the computer program comprising computer-executable instructions that control the operation of the device 200 when loaded into the processor 216. As an example, the computer program may include one or more sequences of one or more instructions. The computer program may be provided as a computer program code. The processor 216 is able to load and execute the computer program by reading the one or more sequences of one or more instructions included therein from the memory 215. The one or more sequences of one or more instructions may be configured to, when executed by the processor 216, cause the device 200 to carry out operations, procedures and/or functions described in the foregoing in context of the imaging system 100, 100'. Hence, the device 200 may comprise at least one processor 216 and at least one memory 215 including computer program code for one or more programs, the at least one memory 215 and the computer program code configured to, with the at least one processor 216, cause the device 200 to perform operations, procedures and/or functions described in the foregoing in context of the imaging system 100.

The computer program may be comprised in a computer program product. According to an example embodiment, the computer program product may comprise a non-transitory computer-readable medium. Thus, the computer program may be provided e.g. as a computer program product comprising at least one computer-readable non-transitory medium having program code stored thereon, the program code, when executed by the device 200, causing the apparatus at least to perform operations, procedures and/or functions described in the foregoing in context of the first device 110. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method, comprising:
  facilitating a digital imaging system for capturing image data, said digital imaging system comprising a first imaging subsystem that comprises a first image sensor arranged to receive light via a first lens and a second imaging subsystem that comprises a second image sensor arranged to receive light via a second lens, wherein said first and second imaging subsystems are arranged such that optical axes of said first and second lenses are in parallel to each other;

reading pixel values from respective light-sensitive areas of said first and second image sensors, comprising
reading pixel values for a first image from a first readout area on the first image sensor,
reading pixel values for a second image from a second readout area on the second image sensor, and
reading pixel values for support data from at least one portion of a light-sensitive area adjacent to a respective readout area on at least one of the first and second image sensors; and
deriving disparity information pertaining to said first and second images on a basis of said pixel values read for the first image, for the second image and for said support data.

2. A method according to claim 1, wherein said first and second readout areas are rectangular readout areas of identical size and aspect ratio.

3. A method according to claim 2, wherein each of said first and second readout areas is a preselected one of at least two predefined rectangular readout areas that have different aspect ratios.

4. A method according to claim 3, wherein said at least two predefined rectangular readout areas that have different aspect ratios comprise a first predefined readout area having the aspect ratio of 4:3 and a second predefined readout area having the aspect ratio of 16:9.

5. A method according to claim 1, wherein said first and second imaging subsystems comprise identical arrangements of a lens and an image sensor.

6. A method according to claim 1, wherein a field of view (FOV) enabled by the second imaging subsystem completely encompasses the FOV enabled by the first imaging subsystem at least in one dimension.

7. A method according to claim 6, wherein the light-sensitive area of the second image sensor is larger than the light-sensitive area of the first image sensor in said at least one dimension such that image content projected on the light-sensitive area of the second image sensor completely encloses image content projected on the light-sensitive area of the first image sensor in said at least one dimension.

8. A method according to claim 1, wherein reading pixel values for support data comprises reading pixel values from an unused area that is between the first readout area and a border of the light-sensitive area of first image sensor on a side of the first image sensor that is furthest from the optical axis of second lens.

9. A method according to claim 8, wherein reading pixel values for support data comprises reading pixel values from an unused area that is between the second readout area and a border of the light-sensitive area of the second image sensor on a side of the second image sensor that is furthest from the optical axis of first lens.

10. A computer program product comprising at least one computer readable non-transitory medium having at least computer readable program code stored thereon, the program code configured to cause performing, when said program code is run on a computing apparatus, at least the following:
facilitate a digital imaging system for capturing image data, said digital imaging system comprising a first imaging subsystem that comprises a first image sensor arranged to receive light via a first lens and a second imaging subsystem that comprises a second image sensor arranged to receive light via a second lens, wherein said first and second imaging subsystems are arranged such that optical axes of said first and second lenses are in parallel to each other;
read pixel values from respective light-sensitive areas of said first and second image sensors, comprising
read pixel values for a first image from a first readout area on the first image sensor,
read pixel values for a second image from a second readout area on the second image sensor, and
read pixel values for support data from at least one portion of a light-sensitive area adjacent to a respective readout area on at least one of the first and second image sensors; and
derive disparity information pertaining to said first and second images on basis of said pixel values read for the first image, for the second image and for said support data.

11. A computer program product according to claim 10, wherein said first and second readout areas are one of following:
a rectangular readout areas of identical size and aspect ratio; and
a preselected one of at least two predefined rectangular readout areas that have different aspect ratios.

12. An apparatus, comprising:
at least one processor; and
a memory storing a program of instructions;
wherein the memory storing the program of instructions is configured to, with the at least one processor, configure the apparatus to at least:
facilitate a digital imaging system for capturing image data, said digital imaging system comprising a first imaging subsystem that comprises a first image sensor arranged to receive light via a first lens and a second imaging subsystem that comprises a second image sensor arranged to receive light via a second lens, wherein said first and second imaging subsystems are arranged such that optical axes of said first and second lenses are in parallel to each other;
read pixel values from respective light-sensitive areas of said first and second image sensors, comprising
read pixel values for a first image from a first readout area on the first image sensor and read pixel values for a second image from a second readout area on the second image sensor, and
read pixel values for support data from at least one portion of a light-sensitive area adjacent to a respective readout area on at least one of the first and second image sensors; and
derive disparity information pertaining to said first and second images on basis of said pixel values read for the first image, for the second image and for said support data.

13. An apparatus according to claim 12, wherein said first and second readout areas are rectangular readout areas of identical size and aspect ratio.

14. An apparatus according to claim 13, wherein each of said first and second readout areas is a preselected one of at least two predefined rectangular readout areas that have different aspect ratios.

15. An apparatus according to claim 14, wherein said at least two predefined rectangular readout areas that have different aspect ratios comprise a first predefined readout area having the aspect ratio of 4:3 and a second predefined readout area having the aspect ratio of 16:9.

16. An apparatus according to any of claim 12, wherein said first and second imaging subsystems comprise identical arrangements of a lens and an image sensor.

17. An apparatus according to any of claim 12, wherein a field of view (FOV) enabled by the second imaging subsystem completely encompasses the FOV enabled by the first imaging subsystem at least in one dimension.

18. An apparatus according to claim 17, wherein the light-sensitive area of the second image sensor is larger than the light-sensitive area of the first image sensor in said at least one dimension such that image content projected on the light-sensitive area of the second image sensor completely encloses image content projected on the light-sensitive area of the first image sensor in said at least one dimension.

19. An apparatus according to any of claim 12, wherein the apparatus is configured to read pixel values for support data from an unused area that is between the first readout area and a border of the light-sensitive area of first image sensor on a side of the first image sensor that is furthest from the optical axis of second lens.

20. An apparatus according to claim 19, wherein the apparatus is configured to read pixel values for support data from an unused area that is between the second readout area and a border of the light-sensitive area of the second image sensor on a side of the second image sensor that is furthest from the optical axis of first lens.

* * * * *